June 10, 1947. B. B. MURAD ET AL 2,421,901
MECHANICAL MOVEMENT
Filed Sept. 7, 1944

INVENTORS
BILL B. MURAD
JOHN S. BARBIC
BY
Morton S. Brockman

Patented June 10, 1947

2,421,901

UNITED STATES PATENT OFFICE 2,421,901

MECHANICAL MOVEMENT

Bill B. Murad and John S. Barbic, Cleveland, Ohio

Application September 7, 1944, Serial No. 553,056

1 Claim. (Cl. 74—57)

This invention relates to hand tools and particularly to small mechanical tools used for deburring roughly drilled holes, reaming, screwing and similar operations.

The primary object of this invention is to provide a light weight portable device which may be quickly and easily used to perform the operations above set forth.

Another object is to provide an article of the kind mentioned which may be quickly and easily stamped out of sheet metal and which is economical to assemble and manufacture.

A further object is to provide such device so that it may be used in tight or cramped spaces.

These and other objects of the invention will become apparent from a reading of the following specification and claim, together with the accompanying drawing, in which like parts are referred to and indicated by like reference characters and wherein:

Figure 1:
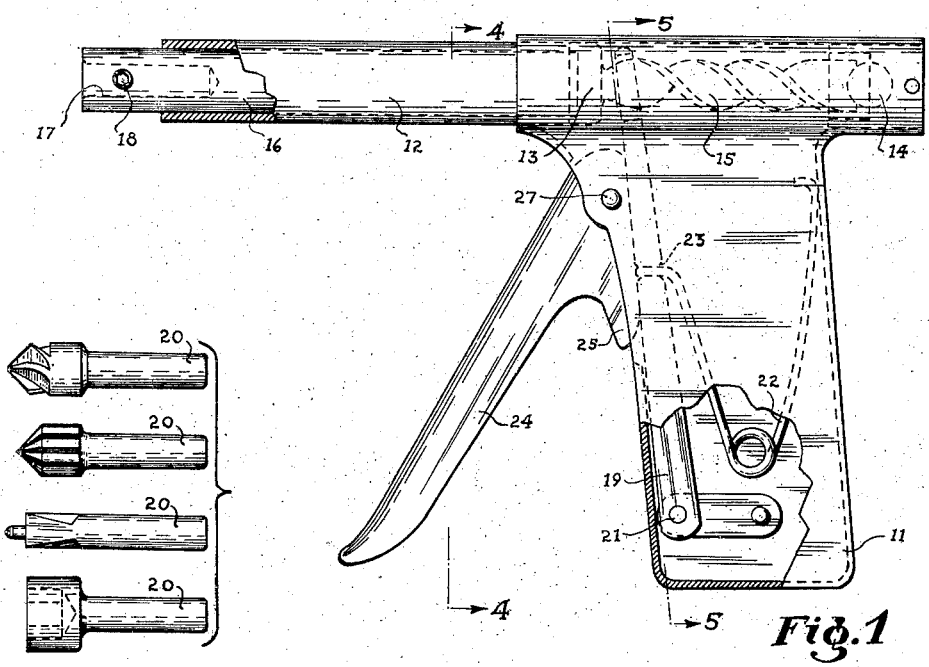
Figure 1 is a side elevation of the tool with parts broken away to show construction.
Figure 2:
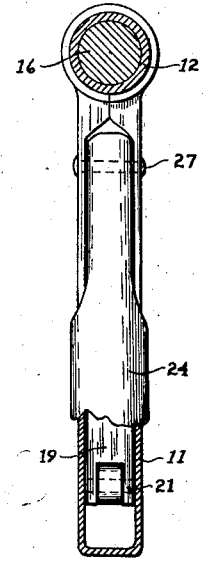
Figure 2 are views of some of the special tools adaptable for use with this instrument.
Figure 3:
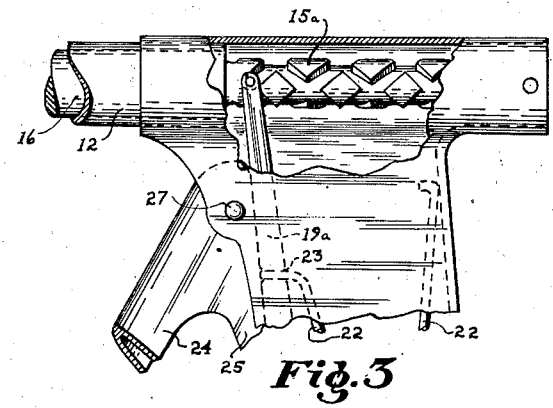
Figure 3 is a side elevation of a modified form of a rotating mechanism used in this device.
Figures 4, 5:
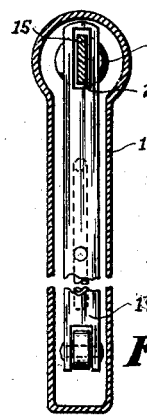
Figure 4 is a vertical cross-sectional view of the tool taken along the line and in the direction of the arrows 4—4 of the Figure 1.
Figure 5 is a similar view taken along the line and in the direction of the arrows 5—5 of the Figure 1.

The instant invention consists broadly of a body or handle member, a cylinder, a spindle, a screw means, and a trigger device. Each of these elements will be described hereinafter.

The body or handle member 11 is made of sheet metal and is formed to resemble and fit the hand like a pistol grip. It is hollow and therefore has space for the other elements of the tool. The top part of the body member 11 is rounded and forms a substantially cylindrical chamber.

Attached to the body member 11, and extending forward of the cylindrical chamber is a cylinder 12. This cylinder 12 may be made as long as desired but one about four inches long will suffice for ordinary purposes.

In the forward part of the cylindrical chamber and immediately in back of the cylinder 12 there is mounted a simple roller bearing 13. In the rear of the cylindrical chamber and aligned with the roller bearing 13 there is mounted a thrust bearing 14. This may be, as is shown in the drawing, a simple steel ball resting in a conical socket.

The screw member 15 is a twisted strip of metal which has disks or roller portions on each end thereof which fit in and smoothly engage the aforesaid bearings 13 and 14 so that the screw may easily be rotated in the cylindrical chamber of the handle member.

Below the cylindrical chamber and ascending up from the bottom of the handle member 11, is the lever 19. This is also referred to herein as the arm member. The lower or fixed end of the lever 19 is pivoted on the pin 21 which projects through the sides of the body member 11 and is suitably peened or secured to prevent accidental removal. The upper or movable end of the lever 19 has a slot 26 therein which engages and through which the screw 15 passes. The slot 26 has a shape substantially the same as the cross-section of the screw 15 and is of a size slightly larger than the pertinent dimensions of the screw. The slot during movement substantially retains its position relative to the body member 11 and therefore the movement thereof causes the screw 15 to rotate.

Inside the handle or body member 11 there is also mounted an expansion spring 22. One end, the fixed end thereof, abuts the inside wall of the handle member 11 and the other end fits into the hole 23 in the lever 19. The spring 22 tends to keep the lever 19 forward and to urge the slotted portion of the lever adjacent to the roller bearing 13.

The trigger member 24 is designed to be operated by the fingers when the hand is squeezed. It is pivoted in the handle member 11 by the pin 27. Its arm portion 25 engages the lever 19 and as the finger portion is closed and brought toward the body member, the arm portion 25 moves the lever 19 backward so that the slotted portion thereof is adjacent to the thrust bearing 14. Moving the trigger back and forth causes the lever 19 to reciprocate and the screw to rotate first in one direction and then in the opposite direction.

The spindle member 16 is simply a short piece of solid rod which easily fits into the cylinder 12 and is rotatable therein. The inner end of the spindle is firmly attached to the screw 15 at the roller bearing 13. Its forward or open end projects outwardly of the cylinder 12 a short distance and has an axial socket 17 therein which receives and holds the shank 20 of the different tools or implements which may be used with the device. A small set screw 18 is mounted in the spindle and extends through to the socket 17 to facilitate the retention of the implement being used.

The implements usable with this tool are of many types. A few, for the purpose of illustration, are shown in the drawing. They may be designed to de-bur roughly drilled holes in metal or wood, to ream holes in plastic or wood, to fit over and screw or unscrew nuts or bolts, and to fit screw slots or heads for insertion or removal in wood, plastic materials or metal. Many other implements may be designed and used with this tool.

It should be noted also that for the sake of simplicity and simple illustration, the preferred form of the gun is shown with an oscillating lever 19 and a reversely rotatable screw 15. However, the device may be simply and easily modified so that while the lever 19 oscillates, the screw 15 may be made to rotate in one direction only. This may be easily done by substituting for the parallel threaded screw 15 a screw 15a which has crossed oppositely running spiralled grooves and providing it with a follower which engages the oppositely running spiralled grooves alternately. Screws and followers of this type are common and are well known in the art.

It will now be clear that there is provided a device which accomplishes the objects heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

A hand tool, comprising in combination, a body member made of sheet metal bent to form a hollow handle and a cylinder integral therewith, the said handle having two pins extending between the walls thereof; a spindle member having an implement retaining means on one end and a screw portion on the other end thereof, the said spindle member being rotatably mounted in said cylinder; a first lever member pivotally mounted in the hollow handle on one of the said pins and being engageable with the said screw portion; and a second lever member, made of sheet metal bent to form a trigger means, pivotally mounted on the other of the two pins and being engageable with the first lever member in a manner whereby the spindle member may be rotated in the cylinder.

BILL B. MURAD.
JOHN S. BARBIC.

REFERENCES CITED

The following references are of record in the file of this patent:

UNITED STATES PATENTS

| Number | Name | Date |
| --- | --- | --- |
| 532,145 | Defatsch | Jan. 8, 1895 |
| 2,301,413 | Kilcup | Nov. 10, 1942 |
| 157,099 | Mackay | Nov. 24, 1874 |